United States Patent
Bennett et al.

(10) Patent No.: US 8,160,223 B2
(45) Date of Patent: Apr. 17, 2012

(54) SYSTEM AND METHOD FOR MANAGING A CONFERENCE CALL

(75) Inventors: William E. Bennett, Tucson, AZ (US); James E. Christensen, Cortlandt Manor, NY (US); Stephen E. Levy, Honolulu, HI (US); Jeremy Sussman, Bedford Hills, NY (US); Tracee L. Wolf, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 11/266,138

(22) Filed: Nov. 2, 2005

(65) Prior Publication Data

US 2007/0116226 A1 May 24, 2007

(51) Int. Cl.
*H04M 3/42* (2006.01)
*G06F 15/16* (2006.01)

(52) U.S. Cl. .................................. 379/202.01; 709/204
(58) Field of Classification Search ............. 379/202.01; 705/8, 9; 709/204; 348/14.01
See application file for complete search history.

(56) References Cited

U.S. PATENT DOCUMENTS

| | | | |
|---|---|---|---|
| 6,088,732 A * | 7/2000 | Smith et al. ................. 709/229 |
| 6,801,610 B1 | 10/2004 | Malik | |
| 7,219,303 B2 * | 5/2007 | Fish ............................. 715/753 |
| 2003/0105820 A1* | 6/2003 | Haims et al. ................. 709/205 |
| 2004/0047461 A1* | 3/2004 | Weisman et al. ........ 379/202.01 |
| 2004/0199580 A1* | 10/2004 | Zhakov et al. ............... 709/204 |
| 2006/0067250 A1* | 3/2006 | Boyer et al. ................. 370/260 |
| 2006/0224430 A1* | 10/2006 | Butt ............................... 705/8 |

* cited by examiner

*Primary Examiner* — Davetta W Goins
*Assistant Examiner* — Mohammad Islam
(74) *Attorney, Agent, or Firm* — Jon A. Gibbons; Fleit Gibbons Gutman Bongini & Bianco PL

(57) ABSTRACT

A system, method, and computer program product for initiating a conference call are disclosed. The method includes running a conference call managing application. The method also includes receiving at least one participant-defined condition. The participant-defined condition is associated with at least one conference call defining a status of a participant's communication device to connect the participant to the conference call. At least one alert is sent out to at least all required participants of the conference call, in response to the participant-defined condition being satisfied to start the conference call.

13 Claims, 7 Drawing Sheets

| PARTICIPANT | DEVICE STATUS (LOCATION, AVAILABILITY, SUBSCRIBER ID) | REQUIRED |
|---|---|---|
| PARTICIPANT A | OFFICE | NO |
| PARTICIPANT B | DEVICE ON, HOME OFFICE | YES |
| PARTICIPANT C | SUBSCRIBER ID 1 | NO |
| ... | ... | ... |
| ... | ... | ... |
| ... | ... | ... |

| PARTICIPANT | DEVICE STATUS (LOCATION, AVAILABILITY, SUBSCRIBER ID) | REQUIRED |
|---|---|---|
| PARTICIPANT A | OFFICE | NO |
| PARTICIPANT B | DEVICE ON, HOME OFFICE | YES |
| PARTICIPANT C | SUBSCRIBER ID 1 | NO |
| ... | ... | ... |
| ... | ... | ... |
| ... | ... | ... |

SYSTEM AND METHOD FOR MANAGING A CONFERENCE CALL

FIELD OF THE INVENTION

The present invention generally relates to the field of telecommunications, and more particularly relates to managing teleconferencing communications.

BACKGROUND OF THE INVENTION

Conference calls are becoming an increasingly popular way to conduct business and are becoming a necessary part of every working day for corporate employees. Conference calls improve productivity by allowing people who are not co-located to work together. While the number of conference calls that corporate employees attend increases, the amount of time wasted on starting those conferences also increases. An attendant productivity loss accompanies conference calls, for example, the means of entering the call. Most of the wasted time occurs while the meeting attendees trickle into the conference call, or waiting for one or more key people to join the call. Conference call systems of today lack the ability to manage conference calls based on the availability of the participants.

For example, typically a first participant connects into the conference call waiting for another participant to join. After time passes another participant joins and this process continues until all participants are connected to the conference call. However, in many situations one or more of the participants have not called-in causing the other participants to have to wait to start the meeting, thereby wasting valuable time. The unavailable participant may not have called into the conference because they were unavailable, forgot about the meeting, misplaced the call-in information, or the like. The conference call is in a started state even though all of the participants are not available. The available participants do not know when the unavailable participant will join or if they should start the meeting without them.

Therefore a need exists to overcome the problems with the prior art as discussed above.

SUMMARY OF THE INVENTION

Briefly, in accordance with the present invention, disclosed are a system, method, and computer program product for initiating a conference call. The method includes running a conference call managing application. The method also includes receiving at least one participant-defined condition. The participant-defined condition is associated with at least one conference call defining a status of a participant's communication device to connect the participant to the conference call. At least one alert is sent out to at least all required participants of the conference call, in response to the participant-defined condition being satisfied to start the conference call.

In another embodiment of the present invention a teleconferencing system for managing and initiating at least one teleconference call is disclosed. The system comprises a conference call managing application. The system also includes a receiver for receiving at least one participant-defined condition. The participant-defined condition is associated with at least one conference call defining a status of a participant's communication device to connect the participant to the conference call. A transmitter is also included for sending out at least one alert to at least all required participants of the conference call, in response to the participant-defined condition being satisfied to start the conference call.

In yet another embodiment of the present invention a computer program product for initiating a conference call is disclosed. The computer program product includes running a conference call managing application. The method also includes receiving at least one participant-defined condition. The participant-defined condition is associated with at least one conference call defining a status of a participant's communication device to connect the participant to the conference call. At least one alert is sent out to at least all required participants of the conference call, in response to the participant-defined condition being satisfied to start the conference call.

An advantage of the foregoing embodiments of the present invention is that participants of a teleconference call are able to visually see the status of the teleconference. Another advantage of the present invention is that participants can define status conditions and connection parameters for being connected to the teleconference. A conference call is not started if the required participants are not available, thereby saving valuable time.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Exemplary System

Figure 1:
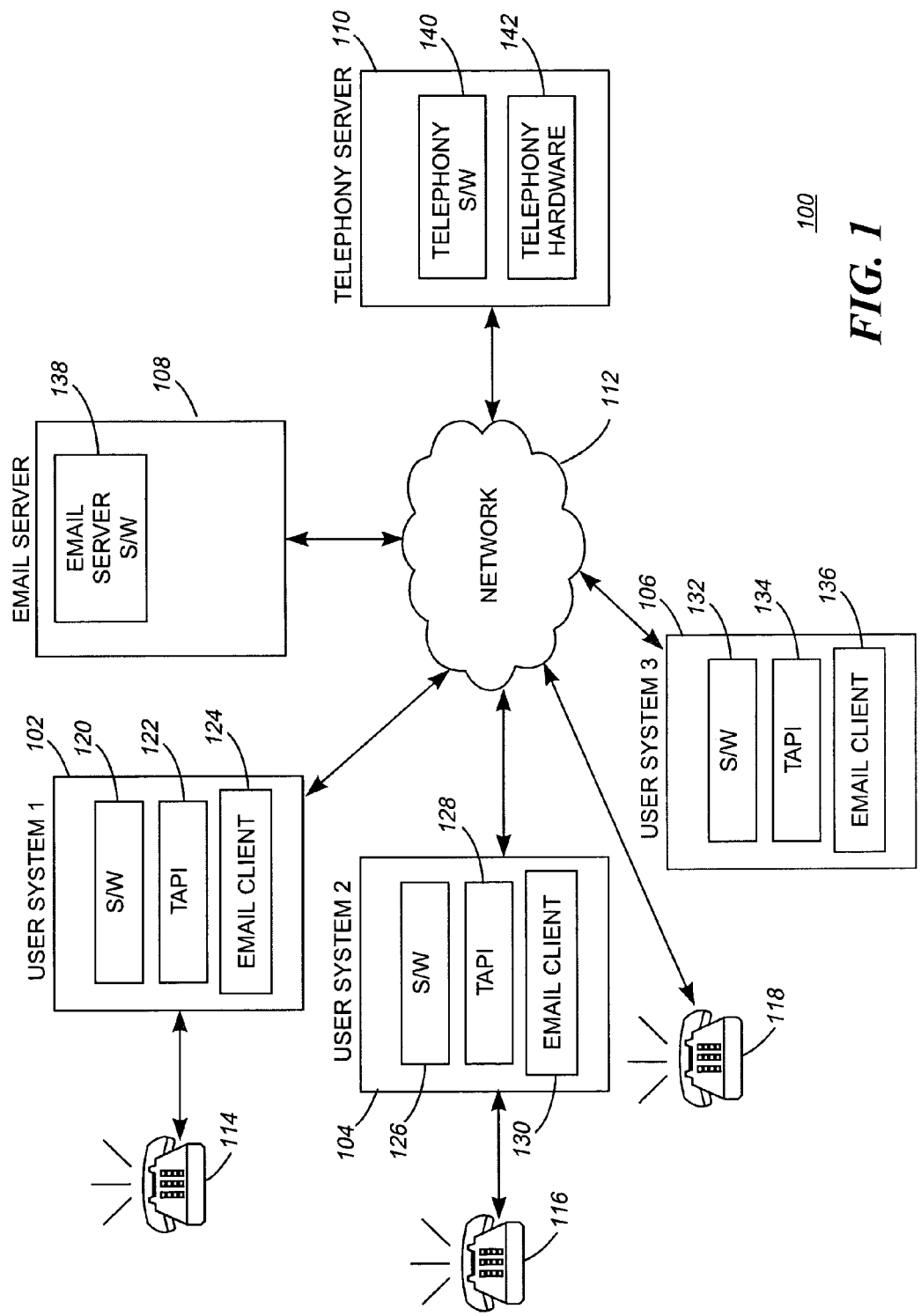
FIG. 1 is block diagram illustrating an exemplary telephony system according to an embodiment of the present invention.
Figure 2:
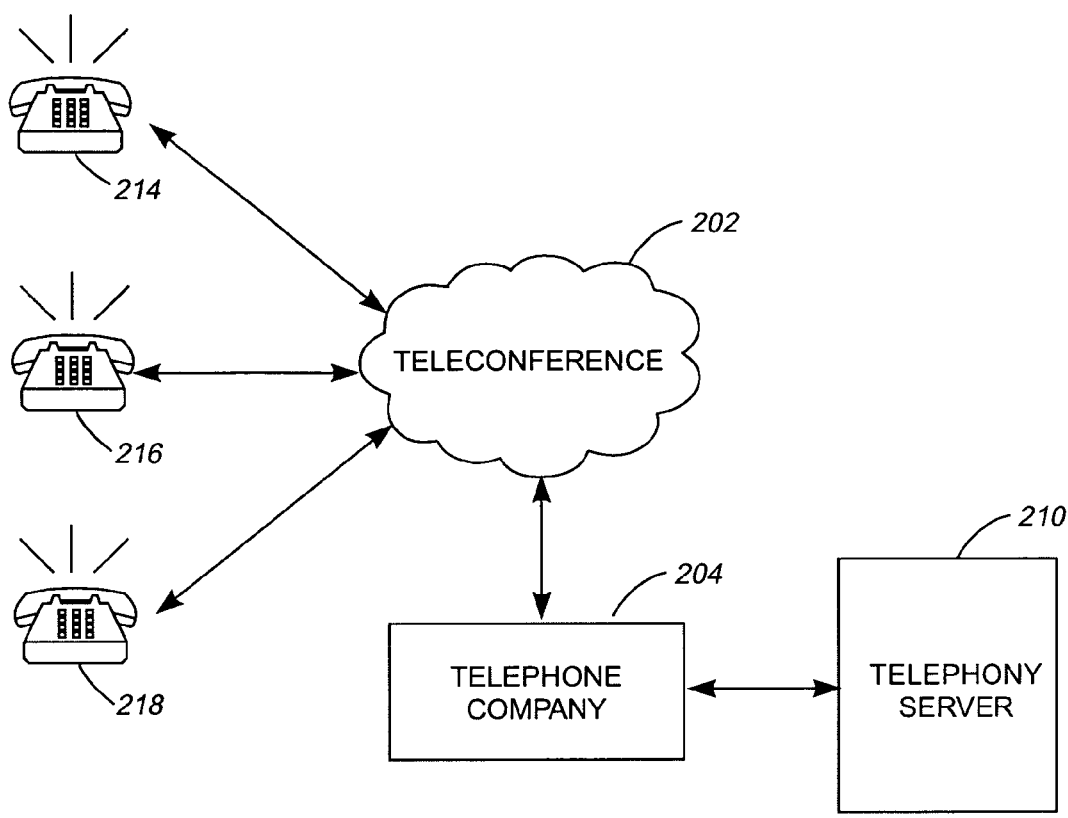
FIG. 2 is a block diagram illustrating another exemplary telephony system according to an embodiment of the present invention.

According to an embodiment of the present invention, as shown in FIG. 1, an exemplary telephony system 100 is illustrated. FIG. 2 shows a system 100 comprising user systems 102, 104, 106. Although three user systems are shown, any number of user systems can be included in the telephony system 100. User system1 102, user system2 104, and user system3 106 communicate with an email server 108 and a telephony server 110 through a network 112. The network 112, according to one embodiment, is a LAN, WAN, World Wide Web, wired, wireless network, or the like. Communication devices 114, 116 such as a telephone are communicatively coupled to user system1 102 and user system2 104 respectively. The communication devices 114, 116 interface with the user systems 102, 104 to make calls through the telephony server 110. In another embodiment, a communication device 118 is directly connected to the network 112 for making calls through the telephony server 110.

Each user system 102, 104, 106 includes, among other things, software 120, 126, 132, a telephony application programming interface (TAPI) 122, 128, 134, and an email client 124, 130, 136. The software 120, 126, 132, for example, is telephony software allowing a user to interact with the telecommunication system associated with the business or home. For example, in one embodiment, the software has a user interface 400 (FIG. 4) for dialing, setting conference calls and monitoring the status of a conference call, checking voicemail and the like. The TAPI client 122, 128, 136 interfaces with the email client 124, 130, and 136 for allowing a user to make telephone calls through the user system 102, 104, 106. For example, using Microsoft Outlook as the email client 124, 130, 136, a contact's phone number can be dialed by the user system 102, 104, 106.

The email server 108 includes email server software 138 such as Microsoft Exchange Server 2003 for interfacing with the email client 124, 10, 136 on the user systems 102, 104, 106. The telephony server 110 is communicatively coupled to the email server 108, user systems 102, 104, 106, and the communication devices 114, 116, 118 through the network 112. The telephony server 110 controls and manages all telephony communications made directly by the communication devices 114, 116, 118 or through the user systems 102, 104, 106.

The telephony server 110 includes telephony software 140 and telephony hardware 142. The telephony software 140, in one embodiment, provides an interface to the user systems 102, 104, 106 for interacting with the telephony server. For example, a user can make a call, pick up a call, transfer a call, and the like using the interface provided by the telephony software 140. The telephony software 140 also manages all of the calls placed and received through the telephony server 110. The telephony software 140 also notifies the participants of a teleconference with information regarding the teleconference. In another embodiment, the telephony software 140 includes speech recognition software for providing voice prompts and responses to a user. The telephony hardware 142 includes telecom cards, VoIP modems and the like.

Alternative Exemplary System

FIG. 2 illustrates an exemplary telephony system 200 according to an alternative embodiment of the present invention. FIG. 2 shows communication devices 214, 216, 218 involved in a teleconference 202. In this embodiment, the telephony server 210 used to manage calls to and from the communication devices 214, 216, 218 and teleconferencing activities is controlled by the telephone company 204. For example, the communication devices 214, 216, 218 call a teleconferencing number to join a teleconference managed by the telephony server at the telephone company. In another embodiment, user systems (not shown) are communicatively coupled to the communication devices 214, 216, 218. The user systems (not shown) provide a user interface (not shown) to the users for interacting with the telephony server 210.

Exemplary Information Processing System

Figure 3:
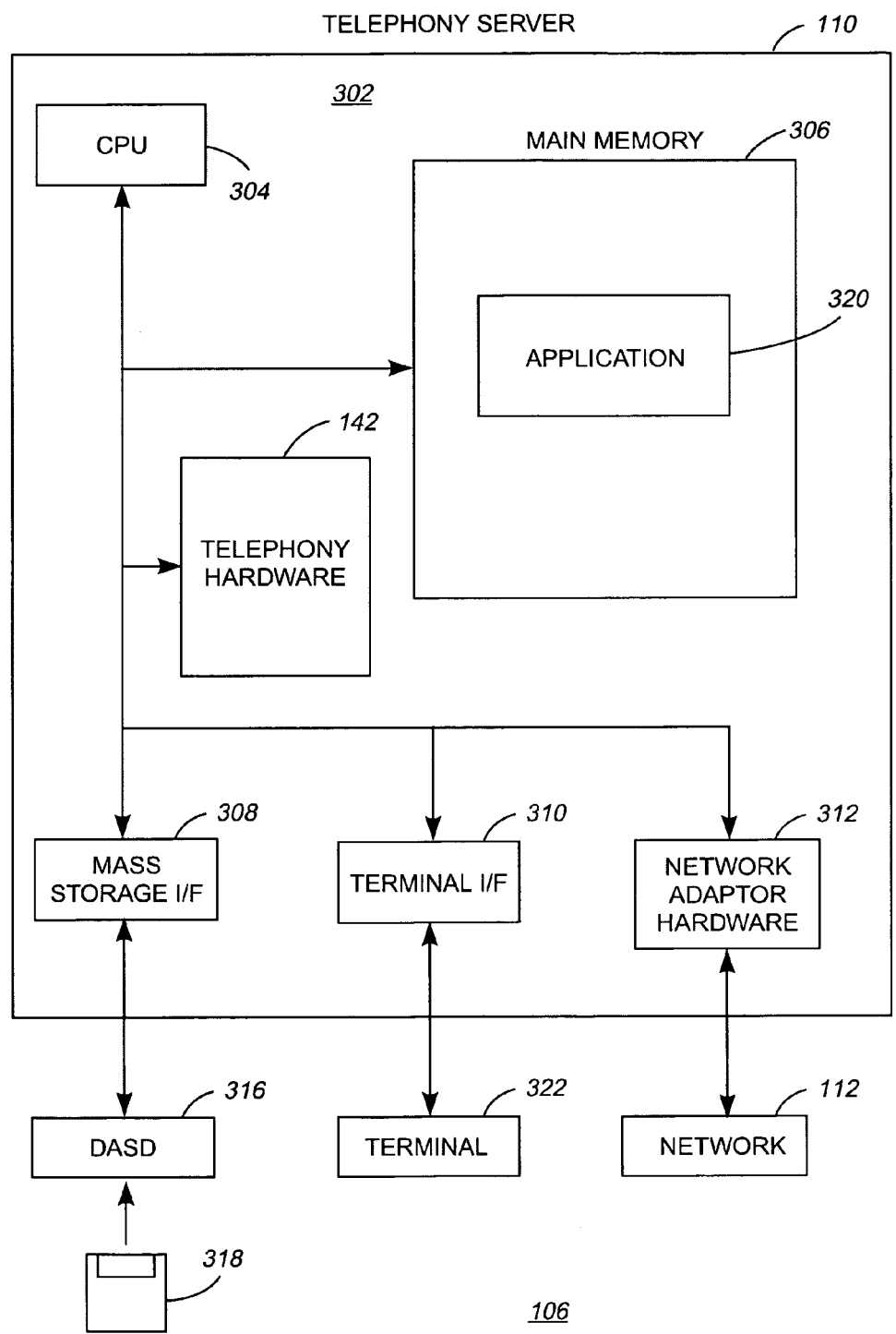
FIG. 3 is an block diagram illustrating an exemplary information processing system according to an embodiment of the present invention.

FIG. 3 is a block diagram illustrating a more detailed view of the telephony server 110 according to an embodiment of the present invention. Although the following discussion is with respect to server1 106, the discussion is also applicable to the user system1 104, user system2 106, server1 106, server2 108, server3 110, and the email server 112 as shown in FIG. 1. The telephony server 110 is based upon a suitably configured processing system adapted to implement the exemplary embodiment of the present invention. Any suitably configured processing system is similarly able to be used as the telephony server 110 by embodiments of the present invention, for example, a personal computer, workstation, or the like. The telephony server 110 includes a computer 302. The computer 302 has a processor 304 that is connected to a main memory 306, mass storage interface 308, terminal interface 310, and network adapter hardware 312. A system bus 314 interconnects these system components. Mass storage interface 308 is used to connect mass storage devices, such as data storage device 316, to the server1 106. One specific type of data storage device is a computer readable medium such as a floppy disk drive, which may be used to store data to and read data from a floppy diskette 318 or CD (not shown). Another type of data storage device is a data storage device configured to support NTFS type file system operations.

The main memory 306 contains an application 320 such as the telephony software 140. For example, the application 320, in one embodiment, is a telephony program for managing incoming and outgoing calls to/from the user systems 102, 104, 106. The application 320, in one embodiment, also provides an interface to a user of the user systems 102, 104, 106 for interacting with a telephony program. An additional teleconference interface is also provided in one embodiment that displays the status of a particular teleconference. The teleconference interface also provides a user with various options that can be performed with respect to the teleconference. The application 320, for example, is running or waiting to be executed. Although illustrated as concurrently resident in the main memory 306, it is clear that respective components of the main memory 306 are not required to be completely resident in the main memory 306 at all times or even at the same time. In one embodiment, the telephony server 110 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the server1 106.

Although only one CPU 304 is illustrated for computer 302, computer systems with multiple CPUs can be used equally effectively. Embodiments of the present invention further incorporate interfaces that each includes separate, fully programmed microprocessors that are used to off-load processing from the CPU 304. Terminal interface 310 is used to directly connect one or more terminals 322 to computer 302 to provide a user interface to the server1 106. These terminals 322, which are able to be non-intelligent or fully programmable workstations, are used to allow system administrators and users to communicate with the server1 106. The terminal 322 is also able to consist of user interface and peripheral devices that are connected to computer 302 and controlled by terminal interface hardware included in the terminal I/F 310 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the telephony server 110.

The network adapter hardware 312 is used to provide an interface to the network 114. Embodiments of the present invention are able to be adapted to work with any data communications connections including present day analog and/or digital techniques or via a future networking mechanism. Telephony hardware 142 is also included as discussed above with reference to FIG. 1 and comprises telecom cards, VoIP modems, voice switches, and the like.

Although the exemplary embodiments of the present invention are described in the context of a fully functional computer system, those skilled in the art will appreciate that embodiments are capable of being distributed as a program product via floppy disk, e.g. floppy disk 318, CD ROM, or other form of recordable media, or via any type of electronic transmission mechanism.

Exemplary Teleconference User Interface

Figures 4, 5:
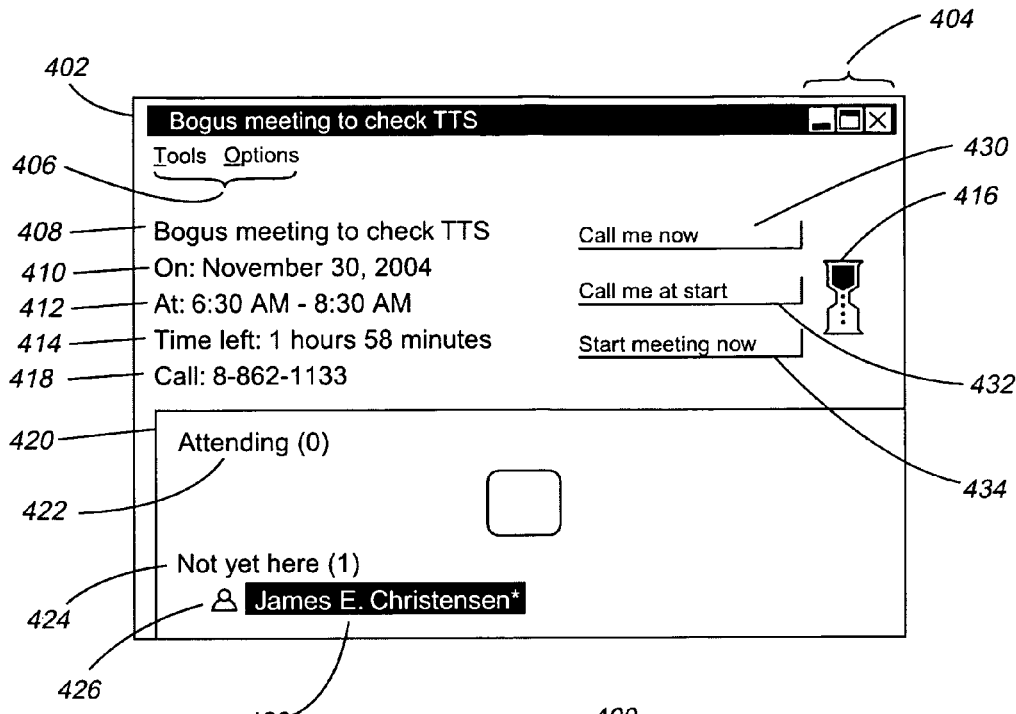
FIG. 4 is an exemplary user interface for interacting with a teleconferencing system according to an embodiment of the present invention.
FIG. 5 is an exemplary participant-defined condition table according to an embodiment of the present invention.

FIG. 4 illustrates an exemplary user interface 400 that provides a user with information and options associated with a teleconference. In one embodiment, the user interface 400 resides in a window 402 that is typical of a graphical user interface. Clickable buttons 404 are provided that allow the user to resize or close the user interface 400. Menu buttons 406 are also included and allow a user to perform various actions as defined within the menus. A description 408 of the teleconference is provided for easily identifying the purpose of the teleconference. A section 410 provides the date of the teleconference. Another section 412 provides the scheduled time of the teleconference. A countdown 414 is also provided to notify the user of the time remaining until the teleconference is scheduled to start. An icon 416 also displays the remaining time. The teleconference call-in information 418 is also displayed to the user.

The user interface 400 also displays a participant information window 420. The participant information window 420 provides the user with information regarding who the participants are, which participants are currently participating and not participating, and the like. For example, current attendance information 422, 424 displays the number of participants currently attending the teleconference and their name 426. An icon 428 may also be provided to uniquely identify a participant or group of participants.

Clickable options 430, 432, 434 allow a user to perform various actions associated with the teleconference. For example, a first clickable option 432 causes the user's communication device to be called as soon as the button 430 is pressed. A second clickable option 432 causes the user's communication device to be automatically called when the teleconference is about to start, is starting, or at any time defined by the user. A third clickable option 434 causes the teleconference to be start when the user clicks the button 434. The user interface 400, in one embodiment, comprises one or more different clickable options and the present invention is not limited to the foregoing description of the user interface 400.

Exemplary Participant Defined Condition Table

FIG. 5 illustrates an exemplary participant-defined condition table 500. The participant-defined conditions table 500 includes various participant-defined conditions that are used by the telephony server 110, 210 to connect participants to a teleconference call. Participant-defined conditions, in one embodiment, are stored in a database (not shown) in the telephony server 110, 210. The participant-defined condition table 500 includes a field 502 for identifying each participant associated with a particular teleconference. For example, entries 504, 506, 508 exist for Participant A, Participant B, and Participant C. A field 510 for a device status condition is also included in the participant-defined conditions table 500. The device status condition field 510 includes entries 512, 514, 516 for the device status condition associated with each participant. For example, Participant A has a device status condition of "Office". Therefore, Participant A will only be connected if Participant A's communication device is located within Participant A's Office. For example, Participant A's communication device can be a cell phone and by using the GPS locator 248 in the cell phone the device can be determined to be in the office or not.

If Participant A forgets the communication device in the office, thereby causing the location of the device to be identified as being in the office (even though the Participant is away from the device and unable to participate in the teleconference using the device), Participant A can remotely update the condition to a default condition or another participant-defined condition. The device status condition for Participant B dictates that the communication device be on and in the home office of Participant B. In another embodiment, if the communication device that is to be used to connect Participant B to the conference call is a wired phone, an on-hook condition can be used. When using a wired device, Participant B can be identified as being in a home office by logging into a particular program. The IP address of the home office computer can be used to signify that Participant B is at the home office.

Participant C has a device status condition of subscriber ID 1. Subscriber ID conditions specify a specific telephone number that the participant has to be called on or call in from. If the participant calls into the teleconference from a different number than what is specified by the subscriber ID condition, the participant will not be connected into the teleconference.

The Required condition field 518 includes entries 520, 522, 524 that identify whether or not the participant is required to start the teleconference. For example, Participant A is not required to start the teleconference. So if participant A is not connected to the teleconference, the teleconference can still be started. Participants can be either required individually or as a group. In the case of a group of participants required to start the conference call, each participant in that group must be available to start the conference call. Availability, in one embodiment, is determined by the ability to satisfy the participant-defined conditions or if the participant has already called into the teleconference. If the participant status conditions are satisfied but a participant is not connected to the teleconference because, for example, the participant walked away from the communication device, the teleconference will not be started.

Additionally, participants, in one embodiment, enter the participant-defined conditions through the teleconference user interface 400. In another embodiment, a different program is used to set the participant-defined conditions. If a user enters a user-defined condition that conflicts with other conditions entered by the participant or other participants, the user is notified of the conflict and is prompted to enter a new condition. This ensures that a deadlock does not occur where no participants will be connected to the teleconference.

The participant-defined condition table 500 is not limited to the foregoing entries and fields and can include a variety of different entries and fields.

Exemplary Process for Dynamically Managing a Teleconference Call

Figure 6:
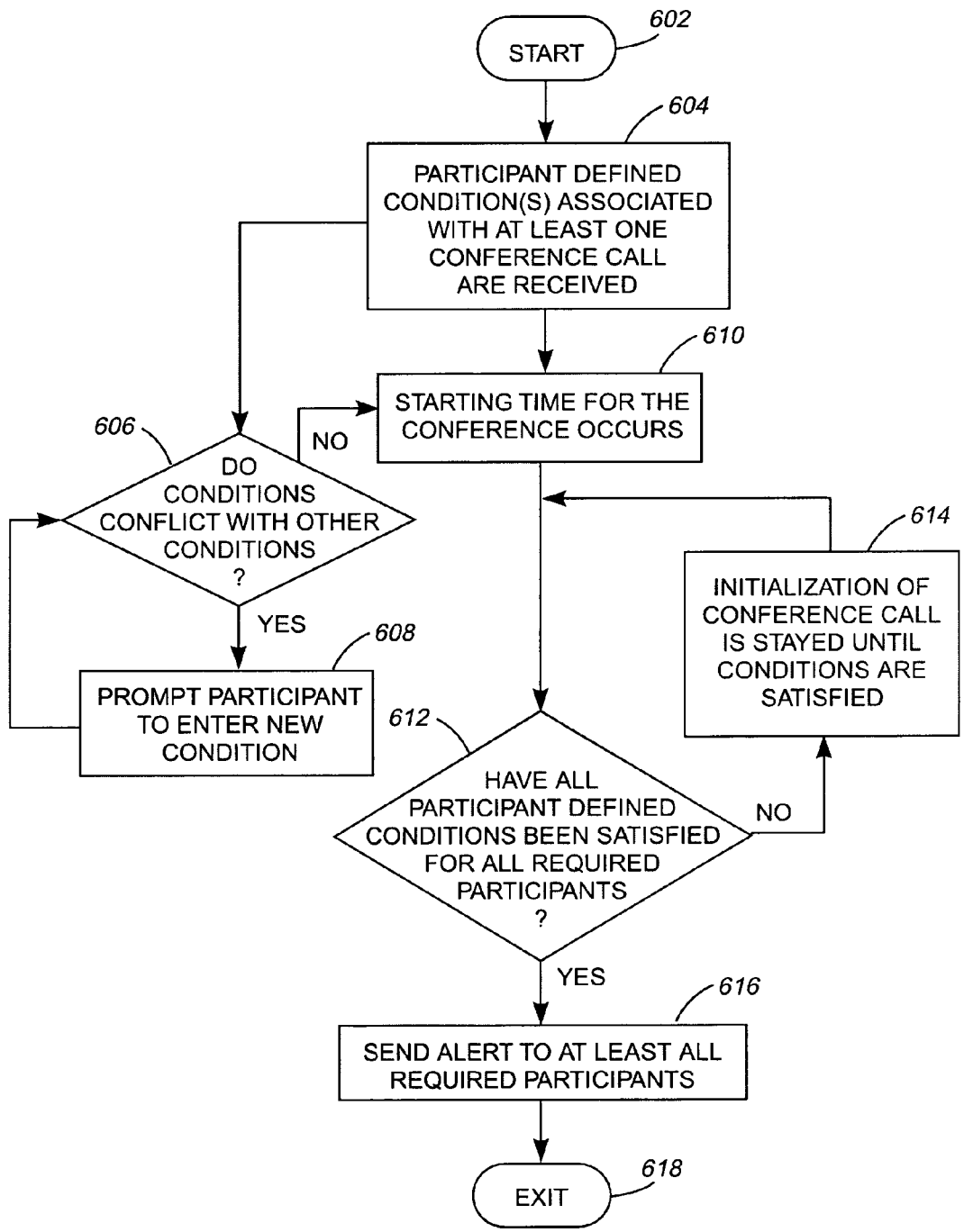
FIG. 6 is an operational flow diagram illustrating an exemplary process of managing a teleconference and its participants according to an embodiment of the present invention.

FIG. 6 is an operational flow diagram showing an exemplary process of managing a teleconference and its participants. The operational flow diagram of FIG. 6 begins at step 602 and flows directly to step 604. The telephony server 110, at step 604 receives participant-defined condition(s) associated with at least one conference call. The participant-defined conditions define a status of a participant's communication device to connect the participant to the conference call. A participant can be any person who is to take part in the conference call including the conference call administrator. The conference call administrator usually is the individual who identifies which participants will be taking part in the conference call.

The telephony server 110, at step 606, determines whether the entered conditions conflict with any other conditions associated with the teleconference call. For example, if conditions can cause a situation to occur where no participants will be connected to the conference call, the condition is not allowed. If the result of this step is negative, the control flows to step 610. If the result of this determination is positive, the control flows to step 608, where the participant is prompted to enter a new condition.

The starting time for the conference call occurs at step 610. The telephony server 110, at step 612, determines if all the participant-defined conditions have been satisfied for all of the required participants. For example, if a condition for a first required participant is that the participant must be in the office, this condition must be satisfied along with the conditions for any other required participant before the conference call is started. If the result of this determination is negative, the conference call, at step 614, is not started until all conditions for the required participants are satisfied. The telephony server, in one embodiment, notifies all of the participants by email, text message, or the like that the conference call is postponed.

If the result of this determination is positive, the telephony server, at step 616, sends an alert to at least all of the required participants. For example, an instant message, telephone call, text message, or the like is sent out to at least all of the required participants to either connect the participant to the conference call or notify the participant that the conference call is starting. These alerts can be sent through a web page, a conference call managing application on a device of the participant, or the like. The control flow then exits at step 618.

Another Exemplary Process for Dynamically Managing a Teleconference Call

Figure 7:
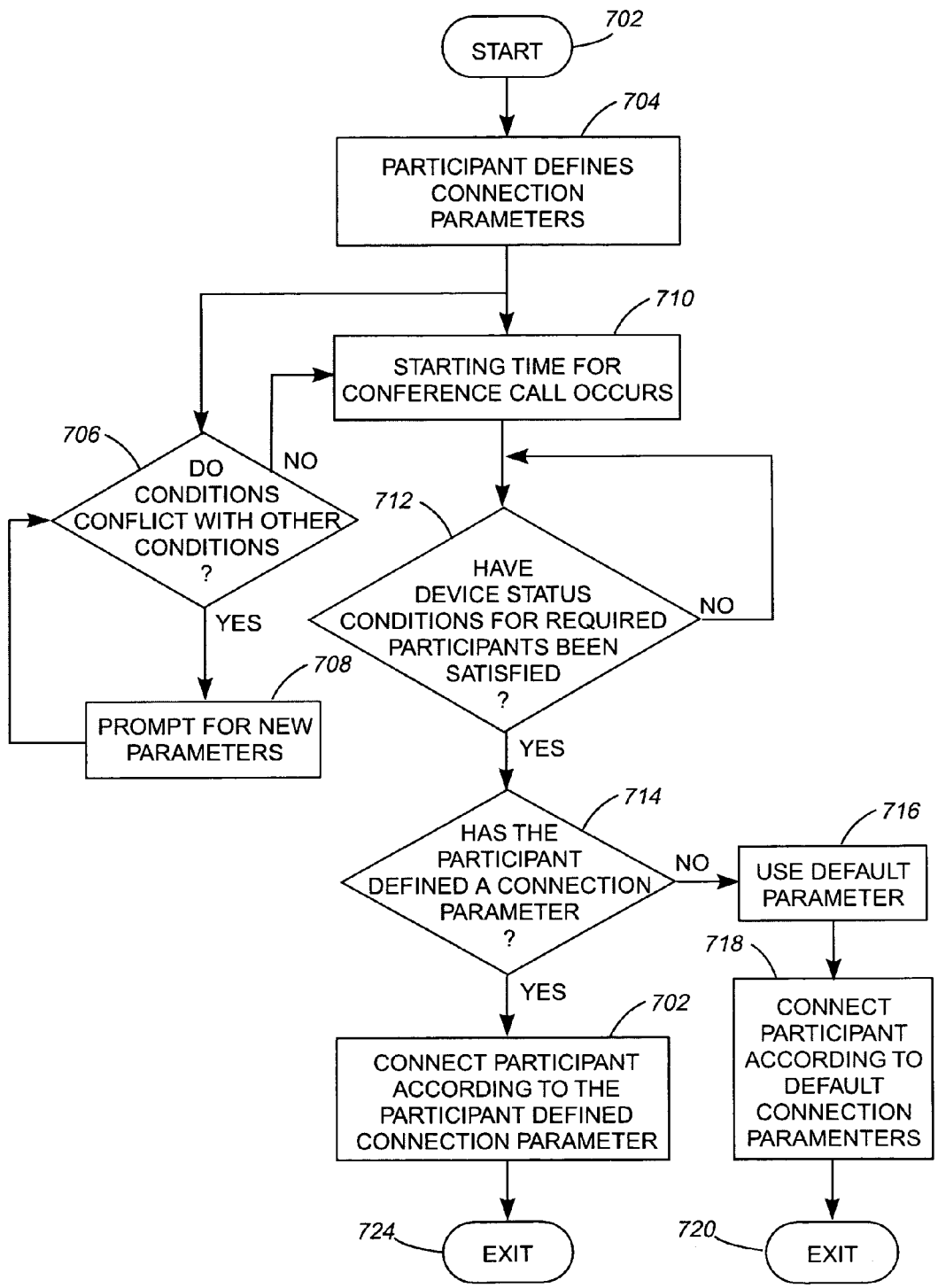
FIG. 7 is an operational flow diagram illustrating another exemplary process of managing a teleconference and its participants according to an embodiment of the present invention.

FIG. 7 is an operational flow diagram showing another exemplary process of managing a teleconference and its participants. The operational flow diagram of FIG. 7 begins at step 702 and flows directly to step 704. A participant of a conference call defines connection parameters that are to be associated with the participant. For example, the participant can enter connection parameters via the teleconference user interface 400 or any other capable program. Connection parameters define how and when a participant is connected to the conference call. For example, a participant may want to be called by the telephony system on a cell phone, landline phone, or the like. Also, the participant may only want to be connected to the conference call when members of a certain group are already connected to the call. A participant may want to be connected only after a specific number of people have joined or after a period of time has passed.

The telephony server 110 or an application residing on a device of the participant, at step 706, determines whether the entered parameters conflict with other parameters associated with the teleconference. For example, if a parameter can cause a situation to occur where no participants will be connected to the conference call, the parameter is not allowed and the participant is prompted to enter a new parameter. If the result of this step is negative, the control flows to step 710. If the result of this determination is positive, the control flows to step 708, where the participant is prompted to enter a new condition.

The starting time for the conference call occurs at step 710. The telephony server 110 determines, at step 712, if device status conditions for all required participants been satisfied. If the result of this determination is negative, the conference call is not started until the conditions for all required participants have been satisfied. If the result of this determination is positive, the telephony server 110, at step 714, determines if the participant has defined a connection parameter. If the result of this determination is negative, the telephony sever 110, at step 716, uses default connection parameters. The participant, at step 718, is connected to the conference call according to the default parameters. For example, the participant can be called at a phone number registered with the teleconferencing software. Also, the participant can be called automatically as soon as the conference call is started. The control flow then exits at step 720. If the result of the determination at step 714 is positive, the participant, at step 722, is connected to the conference call according to the participant-defined connection parameter. The control flow then exits at step 724.

One advantage of the present invention is that participants of a teleconference call are able to visually see the status of the teleconference. Another advantage of the present invention is that participants can define status conditions and connection parameters for being connected to the teleconference. A conference call is not started if the required participants are not available, thereby saving valuable time.

Figure 8:
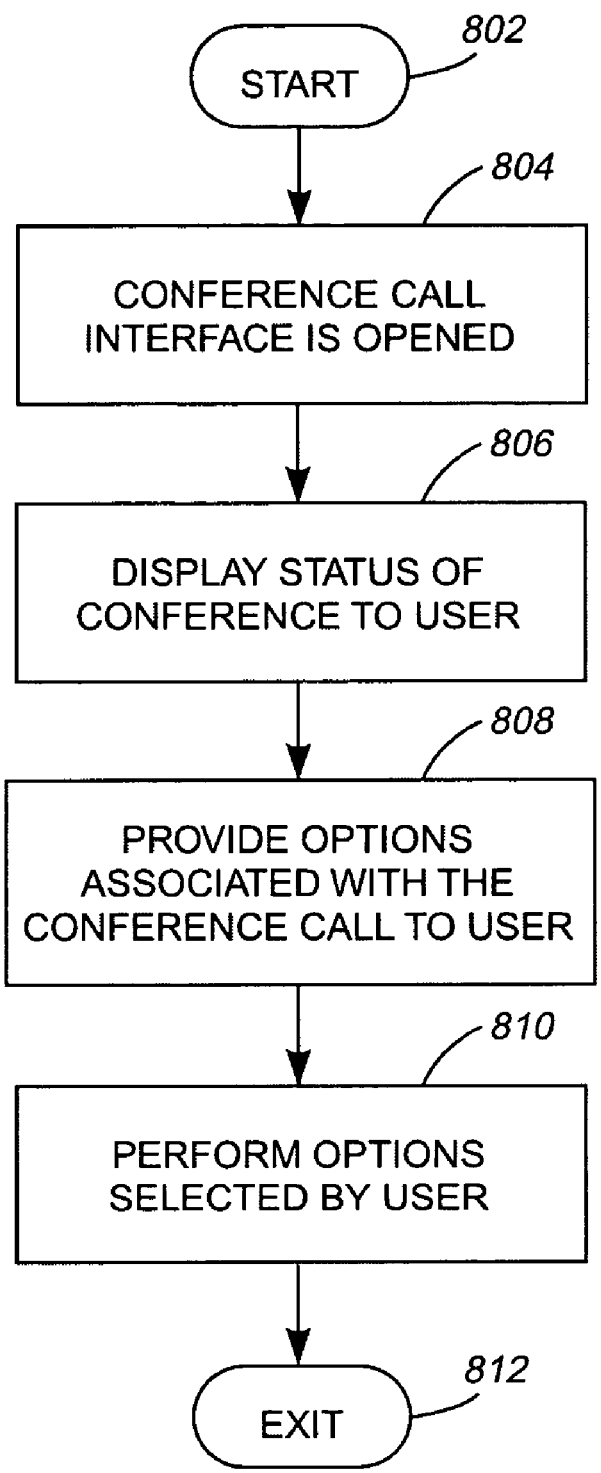
FIG. 8 is an operational flow diagram illustrating another exemplary process of managing a teleconference and its participants according to an embodiment of the present invention.

Exemplary Process of Displaying Teleconference Status Information to a Participant FIG. 8 is an operational flow diagram showing another exemplary process of managing a teleconference and its participants. The operational flow diagram of FIG. 8 begins at step 802 and flows directly to step 804. The teleconference call interface 400, at step 804, is opened by a participant. The interface 400, at step 806, displays the status of the conference call to the participant. For example, participants' names, connection status, and the like are displayed. Also, a description of the conference, starting data and time, remaining time until scheduled starting time, and the like are also displayed to the participant.

Options associated with the conference call, at step 808, are also displayed to the participants. The participant can select one or more of these options to be performed. For example, the participant can select to be called automatically when the conference is scheduled to begin, after a certain amount of time has passed, at the instant the option is selected, and the like. Also, the user can choose to start the conference at the instant the option is selected or define further actions to be taken. The options selected by the user, at step 810, are performed or scheduled to be performed. The control flow then exits at step 812.

Non-Limiting Examples

The foregoing embodiments of the present invention are advantageous because that participants of a teleconference call no longer have to wait connect into the conference call and wait for others to join. Another advantage of the present invention is that the participants are able to visually see the status of the teleconference. Another advantage of the present invention is that participants can define status conditions and connection parameters for being connected to the teleconference. A conference call is not started if the required participants are not available, thereby saving valuable time.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Embodiments of the invention can be implemented as a program product for use with a computer system such as, for example, the computing environment shown in FIG. 1 and described herein. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for initiating a conference call, the method on an information processing system comprising:
running a conference call managing application;
receiving, from an invited participant of a conference call, at least one participant-defined condition associated with at least one conference call, wherein the at least one conference call has been previously scheduled, and wherein the at least one participant-defined condition defines a status of a participant's communication device with respect to a geographic location that is required to be satisfied upon a starting time of the conference call to connect the participant to the conference call;
determining that the starting time has occurred;
identifying, in response to the starting time having occurred, the participant-defined condition received from the participant;
determining, in response to identifying the participant-defined condition received from the participant, the status of the participant's communication device with respect to the geographic location as indicated by the participant-defined condition; and sending out at least one alert to at least one required participant of the conference call, in response to the participant-defined condition being satisfied based on the status that has been determined, to start the conference call.

2. The method of claim 1, wherein the status of the participant's communication device includes an availability of the communication device to receive communication service at the geographic location.

3. The method of claim 1, wherein the participant-defined condition is one of at least:
- a defined number of participants required for the conference call to start; and
- at least one set of required participants required for the conference call to start.

4. The method of claim 1, further comprising:
- determining whether the participant-defined condition conflicts with at least one other participant-defined condition; and
- prompting, in response to determining that a conflict exists, the participant to define a new participant-defined condition.

5. The method of claim 1, wherein the sending out at least one alert further comprises sending the alert through at least one of:
- an instant message;
- a telephone call;
- a text message;
- a web page; and
- a conference call managing application on a device of the participant.

6. The method of claim 1, further comprising:
- receiving at least one participant-defined connection parameter associated with at least one conference call defining a connection method to connect a participant associated with the participant-defined connection parameter to the at least one conference call.

7. The method of claim 1, wherein the status of the participant's communication device includes a communication device subscriber ID with the geographic location of the participant's communication device.

8. A non-transitory computer program product for initiating a conference call, the computer program product comprising:
- a storage medium readable by an information processing system comprising a processing circuit and storing instructions for execution by the information processing system for performing a method comprising:
- running a conference call managing application;
- receiving, from an invited participant of a conference call, at least one participant-defined condition associated with at least one conference call, wherein the at least one conference call has been previously scheduled, and wherein the at least one participant-defined condition defines a status of a participant's communication device with respect to a geographic location that is required to be satisfied upon a starting time of the conference call to connect the participant to the conference call;
- determining that the starting time has occurred;
- identifying, in response to the starting time having occurred, the participant-defined condition received from the participant;
- determining, in response to identifying the participant-defined condition received from the participant, the status of the participant's communication device with respect to the geographic location as indicated by the participant-defined condition; and
- sending out at least one alert to at least one required participant of the conference call, in response to the participant-defined condition being satisfied based on the status that has been determined, to start the conference call.

9. The non-transitory computer program product of claim 8, wherein the status of the participant's communication device includes an availability of the communication device to receive communication service at the geographic location.

10. The non-transitory computer program product of claim 8, wherein the participant-defined condition is one of at least:
- a defined number of participants required for the conference call to start; and
- at least one set of required participants required for the conference call to start.

11. The non-transitory computer program product of claim 8, further comprising instructions for:
- determining whether the participant-defined condition conflicts with at least one other participant-defined condition; and
- prompting, in response to determining that a conflict exists, the participant to define a new participant-defined condition.

12. The non-transitory computer program product of claim 8, wherein the sending out at least one alert further comprises sending the alert through at least one of:
- an instant message;
- a telephone call;
- a text message;
- a web page; and
- a conference call managing application on a device of the participant.

13. The computer program product of claim 8, wherein the status of the participant's communication device includes a communication device subscriber ID with the geographic location of the participant's communication device.

* * * * *